United States Patent
Ishitobi

(10) Patent No.: US 12,401,078 B2
(45) Date of Patent: *Aug. 26, 2025

(54) METHOD FOR MANUFACTURING ELECTRIC VEHICLE BATTERY CASE AND ELECTRIC VEHICLE BATTERY CASE

(71) Applicant: KOBE STEEL, LTD., Hyogo (JP)

(72) Inventor: Hideki Ishitobi, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 825 days.

This patent is subject to a terminal disclaimer.

(21) Appl. No.: 17/753,729

(22) PCT Filed: Sep. 4, 2020

(86) PCT No.: PCT/JP2020/033653
§ 371 (c)(1),
(2) Date: Mar. 11, 2022

(87) PCT Pub. No.: WO2021/070533
PCT Pub. Date: Apr. 15, 2021

(65) Prior Publication Data
US 2022/0344752 A1    Oct. 27, 2022

(30) Foreign Application Priority Data
Oct. 11, 2019   (JP) .................. 2019-187899

(51) Int. Cl.
*H01M 50/121* (2021.01)
*B29C 70/18* (2006.01)
(Continued)

(52) U.S. Cl.
CPC ........... *H01M 50/121* (2021.01); *B29C 70/18* (2013.01); *B29C 70/46* (2013.01); *B60L 50/64* (2019.02);
(Continued)

(58) Field of Classification Search
CPC ............ H01M 50/207; H01M 50/227; H01M 50/249; H01M 50/242; B60L 50/64;
(Continued)

(56) References Cited

U.S. PATENT DOCUMENTS

| | | |
|---|---|---|
| 2010/0136402 A1 | 6/2010 | Hermann et al. |
| 2010/0273034 A1 | 10/2010 | Hermann et al. |

(Continued)

FOREIGN PATENT DOCUMENTS

| | | |
|---|---|---|
| EP | 1249286 A1 | 10/2002 |
| JP | 2004-314721 A | 11/2004 |

(Continued)

OTHER PUBLICATIONS

English translation of JP Publication 2013-133044, Jul. 2013.*
(Continued)

*Primary Examiner* — Brittany L Raymond
(74) *Attorney, Agent, or Firm* — Studebaker Brackett PLLC

(57) ABSTRACT

A method for manufacturing an electric vehicle battery case includes: preparing a frame configured to define a through space inside and a flat plate made of resin; superposing and disposing the flat plate on the frame; and applying pressure to the flat plate from an opposite side from the frame to press the flat plate against the frame to cause the flat plate to swell in the through space, thereby deforming the flat plate into a tray having a bathtub shape including a bottom wall and a peripheral wall provided at a peripheral edge of the bottom wall and configured to define an opening portion, and joining by press-fitting the tray to the frame.

19 Claims, 16 Drawing Sheets

(51) Int. Cl.
   *B29C 70/46*   (2006.01)
   *B29K 101/12*  (2006.01)
   *B29K 105/08*  (2006.01)
   *B29L 31/00*   (2006.01)
   *B60L 50/64*   (2019.01)
   *H01M 50/242*  (2021.01)
   *H01M 50/249*  (2021.01)

(52) U.S. Cl.
   CPC ....... *H01M 50/242* (2021.01); *H01M 50/249* (2021.01); *B29K 2101/12* (2013.01); *B29K 2105/0863* (2013.01); *B29L 2031/7146* (2013.01); *H01M 2220/20* (2013.01)

(58) Field of Classification Search
   CPC . B29C 70/18; B29C 70/46; B29K 2105/0863; B29K 2101/12; B29L 2031/7146
   See application file for complete search history.

(56) References Cited

U.S. PATENT DOCUMENTS

| | | |
|---|---|---|
| 2011/0143179 A1* | 6/2011 | Nakamori .......... H01M 50/271 429/99 |
| 2011/0174556 A1 | 7/2011 | Hermann et al. |
| 2012/0160088 A1 | 6/2012 | Rawlinson |
| 2012/0160583 A1 | 6/2012 | Rawlinson |
| 2012/0161429 A1 | 6/2012 | Rawlinson et al. |
| 2012/0161472 A1 | 6/2012 | Rawlinson et al. |
| 2012/0231306 A1 | 9/2012 | Herron et al. |
| 2012/0237803 A1 | 9/2012 | Mardall et al. |
| 2012/0301765 A1 | 11/2012 | Loo et al. |
| 2012/0308858 A1 | 12/2012 | Hermann et al. |
| 2012/0308859 A1 | 12/2012 | Hermann et al. |
| 2012/0312615 A1 | 12/2012 | Rawlinson |
| 2013/0088044 A1 | 4/2013 | Charbonneau et al. |
| 2013/0088045 A1 | 4/2013 | Charbonneau et al. |
| 2013/0153317 A1 | 6/2013 | Rawlinson et al. |
| 2013/0252059 A1* | 9/2013 | Choi .................... B29C 65/002 156/60 |
| 2014/0182958 A1 | 7/2014 | Rawlinson et al. |
| 2014/0193683 A1 | 7/2014 | Mardall et al. |
| 2014/0352886 A1 | 12/2014 | Choi et al. |
| 2015/0239331 A1 | 8/2015 | Rawlinson et al. |
| 2015/0255764 A1* | 9/2015 | Loo .................... H01M 50/249 429/149 |
| 2018/0334022 A1 | 11/2018 | Rawlinson et al. |

FOREIGN PATENT DOCUMENTS

| | | | |
|---|---|---|---|
| JP | 2010-207838 | A | 9/2010 |
| JP | 2011-124101 | A | 6/2011 |
| JP | 2012-212659 | A | 11/2012 |
| JP | 2013-133044 | * | 7/2013 |
| JP | 2013-133044 | A | 7/2013 |
| JP | 2013-201112 | A | 10/2013 |
| JP | 2015-170452 | A | 9/2015 |
| JP | 2017-226353 | A | 12/2017 |

OTHER PUBLICATIONS

International Search Report issued in PCT/JP2020/033653; mailed Nov. 10, 2020.
International Preliminary Report On Patentability and Written Opinion issued in PCT/JP2020/033653; mailed Apr. 21, 2022.

* cited by examiner

METHOD FOR MANUFACTURING ELECTRIC VEHICLE BATTERY CASE AND ELECTRIC VEHICLE BATTERY CASE

CROSS-REFERENCE TO RELATED APPLICATIONS

This is a national phase application in the United States of International Patent Application No. PCT/JP2020/033653 with an international filing date of Sep. 4, 2020, which claims priority of Japanese Patent Application No. 2019-187899 filed on Oct. 11, 2019 the contents of which are incorporated herein by reference.

TECHNICAL FIELD

The present invention relates to a method for manufacturing an electric vehicle battery case and an electric vehicle battery case.

BACKGROUND ART

An electric vehicle such as an electric car needs to mount with a large capacity battery in order to secure a sufficient cruising distance, and on the other hand, the electric vehicle is required to include a wide vehicle interior. In order to satisfy these requirements, in many electric cars, a large-capacity battery is stored in a battery case and mounted on the entire underfloor surface of the vehicle. Therefore, the electric vehicle battery case is required to have high sealing performance for preventing water from entering from a road surface or the like to prevent malfunctions of electronic components, and high collision strength is required to protect the internal battery.

For example, JP 2017-226353 A discloses a battery case in which sealing performance is improved by using a tray obtained by forming a metal plate into a bathtub shape by cold press forming. In addition, JP 2012-212659 A discloses a battery case in which space efficiency and collision strength are improved by joining a bottom plate and a frame of the battery case by joining means such as welding.

SUMMARY

In the battery case of JP 2017-226353 A, since the metal plate is formed into a bathtub shape by cold press forming, a draft angle of a die (inclination of a side surface) and a ridgeline portion or a corner portion of a bottom portion need to be rounded, and space efficiency for mounting the battery cannot be improved. In addition, it is also necessary to additionally join a bathtub tray and a longitudinal frame being a frame by welding or the like.

In the battery case of JP 2012-212659 A, thermal deformation may occur along with joining means such as welding. Therefore, it is necessary to add an inspection step and a repair step regarding sealing accuracy, joining accuracy, and the like.

In an electric vehicle battery case and a method for manufacturing the same, the present invention has an object to secure sufficient sealing performance and to achieve simple and highly accurate joining.

A first aspect of the present invention provides a method for manufacturing an electric vehicle battery case, the method including: preparing a frame configured to define a space inside and a member to be formed made of resin; superposing and disposing the member to be formed on the frame; and applying pressure to the member to be formed from an opposite side from the frame to press the member to be formed against the frame to cause the member to be formed to swell in the space, thereby deforming the member to be formed into a tray having a bathtub shape including a bottom wall and a peripheral wall provided at a peripheral edge of the bottom wall and configured to define an opening portion, and integrating the tray with the frame.

According to this method, a member to be formed made of resin can be formed into a bathtub shaped tray and integrated with the frame at the same time. Since the member to be formed is formed into the bathtub shaped tray by pressurization, there is no seam in the tray, and high sealing performance can be secured. In addition, since forming of the member to be formed into a bathtub shape and joining by press-fitting of the member to be formed to the frame are simultaneously performed, the joining step can be simplified. Since the tray is integrated with the frame without welding, it is possible to achieve highly accurate joining without causing thermal deformation. Therefore, sufficient sealing performance of the battery case can be secured, and the tray obtained by forming the member to be formed into a bathtub shape and the frame can be simply and highly accurately joined.

The tray is obtained by forming a resin member to be formed into a bathtub shape. That is, the tray is made of resin. Making the tray made of resin allows the weight of the electric vehicle battery case to be further reduced as compared with the case where the tray is made of metal. In addition, since the member to be formed is made of resin, the degree of freedom of the shape of the tray is high.

The tray may further include a flange provided at a tip of the peripheral wall.

The resin constituting the member to be formed may have thermoplasticity. The member to be formed may be heated when pressure is applied to the member to be formed from an opposite side from the frame.

The heating the member to be formed may be performed by at least any one of heating the member to be formed itself and heating the frame.

The member to be formed may have a flat plate shape.

The method for manufacturing an electric vehicle battery case may further include primarily molding the member to be formed including a bottom wall, a peripheral wall provided at a peripheral edge of the bottom wall, and a flange provided at a tip of the peripheral wall.

According to this method, a member to be formed primarily molded into a shape similar to that of the tray, that is, a shape having a bottom wall, a peripheral wall, and a flange is used for deformation into the bathtub shaped tray, and for joining by press-fitting to the frame, due to application of pressure. That is, the deformation of the member to be formed into the tray is performed stepwise in two steps. Therefore, since the amount of strain applied to the member to be formed is reduced as compared with the case where only applying pressure to the flat plate shaped member to be formed causes the member to be formed to be deformed into the tray and causes the tray to be joined by press-fitting to the frame, reduction in local wall thickness can be suppressed.

The resin may be fiber-reinforced resin. The primary molding of the member to be formed may be injection molding.

The resin may be fiber-reinforced resin. The primary molding of the member to be formed may be a hot press of SMC.

The frame may be made of metal.

The applying pressure to the member to be formed from the opposite side from the frame may be performed by a pressure forming method.

By adopting the pressure forming method, omission of a draft angle (inclination of a side surface) which is difficult, for example, in the general cold press forming of metal and reduction in the roundness of the ridgeline portion or the corner portion are enabled, and the degree of freedom of the shape of the tray having a bathtub shape is increased. In addition, omitting the draft angle and reducing the roundness of the ridgeline portion allows the space efficiency of the tray to be improved and a battery having a larger capacity to be mounted. Here, the pressure forming method refers to a method of forming a member by gas or liquid pressure.

The applying pressure to the member to be formed from the opposite side from the frame may include: preparing a hydraulic transfer elastic body configured to be elastically deformed using pressure of liquid, superposing and disposing the hydraulic transfer elastic body on the member to be formed superposed and disposed on the frame, and applying pressure to the member to be formed via the hydraulic transfer elastic body.

According to this method, when the member to be formed is formed into a bathtub shape, liquid to which pressure is applied does not scatter or leak. Here, for example, the hydraulic transfer elastic body may have a structure in which only a lower surface of a metal chamber containing a liquid is closed with a rubber plate. The rubber plate is elastically deformed by adjusting the pressure of the liquid, and forming can be performed without the liquid coming into direct contact with the member to be formed. If the hydraulic transfer elastic body is not used in the pressure forming method, since the member to be formed is directly deformed by a fluid held at a high pressure, it is necessary to strongly constrain the outer edge portion of the member to be formed so that the fluid does not scatter or leak to the outside. However, when the hydraulic transfer elastic body is used, since the liquid to which the force is applied does not scatter or leak, the constraint force on the outer edge portion of the member to be formed can be reduced. Therefore, when the member to be formed is formed into a bathtub shape, the material amount flowing from the outer edge portion to the inside can be increased, and stable machining can be achieved by suppressing cracking or the like of the member to be formed. In addition, since it is not necessary to completely seal the outer edge portion of the member to be formed, maintenance of the die and the pressing machine for constraining the outer edge portion becomes easy, and productivity can be improved.

When the applying pressure to the member to be formed from the opposite side from the frame to deform the member to be formed into the tray is performed, negative angle forming of forming a negative angle at least partially from the bottom wall toward the opening portion of the tray may be performed.

According to this method, since the negative angle is formed when the member to be formed is formed into the tray having a bathtub shape, it is possible to prevent the joining by press-fitting of the tray to the frame from being released by the negative angle portions. Here, the negative angle is a term often used in the forming field using a die, and indicates that the die draft angle in the formed member is less than zero (negative). Therefore, the joining strength between the frame and the tray having a bathtub shape is increased by the negative angle forming. In particular, the negative angle forming is forming peculiar to a pressure forming method because in cold press forming requiring a draft angle using a normal die, there is a problem that a cam mechanism needs to be added and a die structure becomes complicated.

The frame may have a negative angle portion in which a negative angle is formed in advance. The negative angle forming may be performed by pressing the member to be formed against the negative angle portion of the frame when the applying pressure to the member to be formed from the opposite side from the frame to deform the member to be formed into the tray is performed.

According to this method, by the negative angle portion in the frame, the negative angle forming can be easily and reliably performed.

The negative angle forming may be performed by integrally deforming the frame and the member to be formed to form the negative angle when the applying pressure to the member to be formed from the opposite side from the frame to deform the member to be formed into the tray is performed.

According to this method, since the member to be formed and the frame are integrally deformed to form a negative angle, it is not necessary to provide the negative angle portion in advance to the frame. Therefore, negative angle forming can be easily performed.

A second aspect of the present invention provides an electric vehicle battery case including: a frame made of metal configured to define a space inside; and a tray made of resin and having a bathtub shape, the tray including a bottom wall positioned in the space, a peripheral wall provided around the bottom wall and configured to define an opening portion on an opposite side from the bottom wall, and a flange provided at a tip of the peripheral wall, the tray being joined by press-fitting to the frame.

According to this configuration, since the tray has a bathtub shape and has no seam, the sealing performance can be improved, and since the frame and the tray are integrated without being welded, highly-accurate joining is achieved without causing dimensional change due to thermal deformation. In addition, since the tray is made of resin, the weight of the electric vehicle battery case can be further reduced as compared with the case where the tray is made of metal. Furthermore, since the tray is made of resin, the degree of freedom of the shape of the tray is high.

A negative angle portion in which a negative angle directed at least partially inward from the bottom wall, toward an opening portion, of the tray is formed may be provided.

Since the negative angle portion is formed in the tray, it is possible to prevent the joining by press-fitting from disconnection and to improve the strength of the electric vehicle battery case.

The tray may be made of fiber-reinforced resin.

By setting the tray as made of fiber-reinforced resin, it is possible to improve the strength of the tray while securing the weight reduction in the tray.

The frame may be made of an aluminum alloy extruded product, an aluminum alloy cast product, a magnesium alloy extruded product, a magnesium alloy cast product, or a combination thereof.

Since the frame is made of an aluminum-based or magnesium-based material, it is possible to reduce the weight of the frame while securing strength.

The frame may be made of a steel plate roll form material, a steel plate press component, or a combination thereof.

By forming the frame with a steel member, it is possible to increase the strength of the frame while suppressing the cost.

The frame may include a cross member.

Since the frame includes the cross member, the strength of the electric vehicle battery case can be improved. In particular, the cross member can improve strength against collision from the side of the vehicle.

According to the present invention, in an electric vehicle battery case and a method for manufacturing the same, sufficient sealing performance can be secured and simple and highly accurate joining can be achieved.

MODE FOR CARRYING OUT THE INVENTION

First Embodiment

Figure 1:
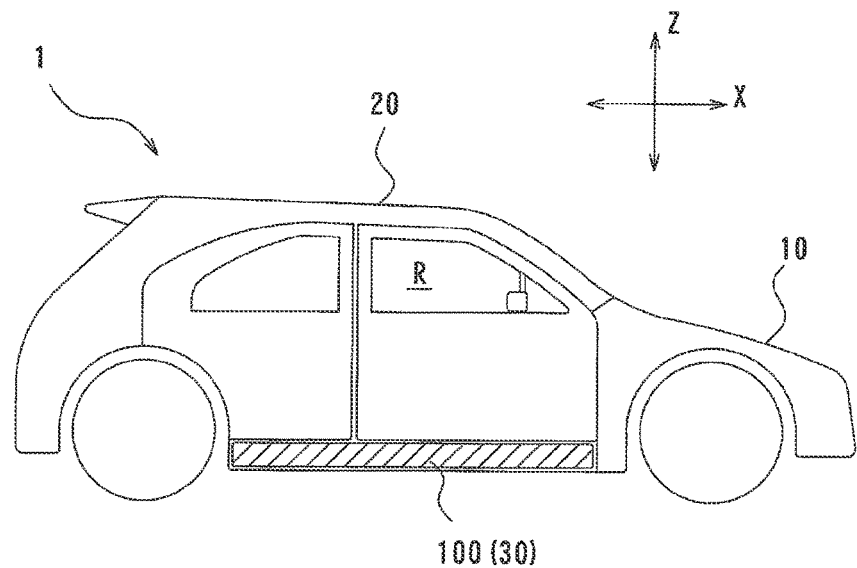
FIG. 1 is a schematic side view of an electric car mounting an electric vehicle battery case according to a first embodiment of the present invention.

Referring to FIG. 1, an electric vehicle 1 is a vehicle that travels by driving a motor by electric power supplied from a battery 30. The electric vehicle 1 is a vehicle that travels by electric power, and may be, for example, an electric car, a plug-in hybrid vehicle, or the like. The type of the vehicle is not particularly limited, and may be a passenger car, a truck, a maintenance vehicle, other mobility, or the like. Hereinafter, a case where the electric vehicle 1 is a passenger car type electric car will be taken as an example and described.

The electric vehicle 1 mounts a motor, a high-voltage apparatus, and the like (not shown) in the vehicle body front portion 10. In addition, the electric vehicle 1 mounts an electric vehicle battery case 100 (hereinafter, also simply referred to as a battery case 100) in which a battery 30 is stored in substantially the entire underfloor space of the vehicle interior R of the vehicle body central portion 20. It should be noted that in FIG. 1, the front-rear direction of the electric vehicle 1 is represented by the X direction, and the height direction is represented by the Z direction. The same notation also applies to the following drawings, and the vehicle width direction is represented by the Y direction in FIG. 2 and subsequent drawings.

Figure 2:
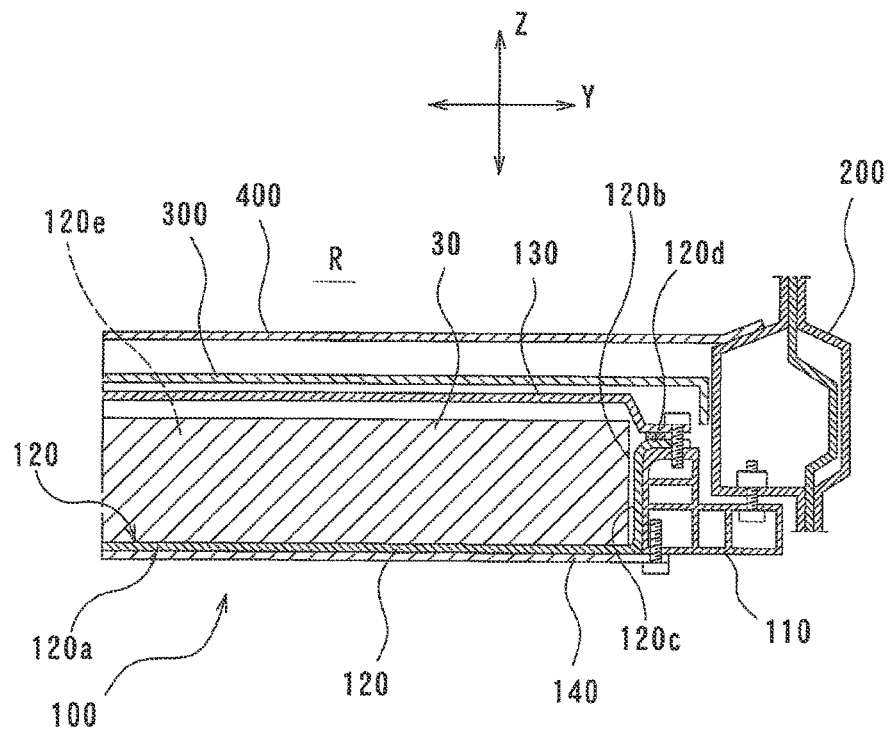
FIG. 2 is a schematic cross-sectional view of an electric vehicle battery case taken along a vehicle width direction.
Figure 3:
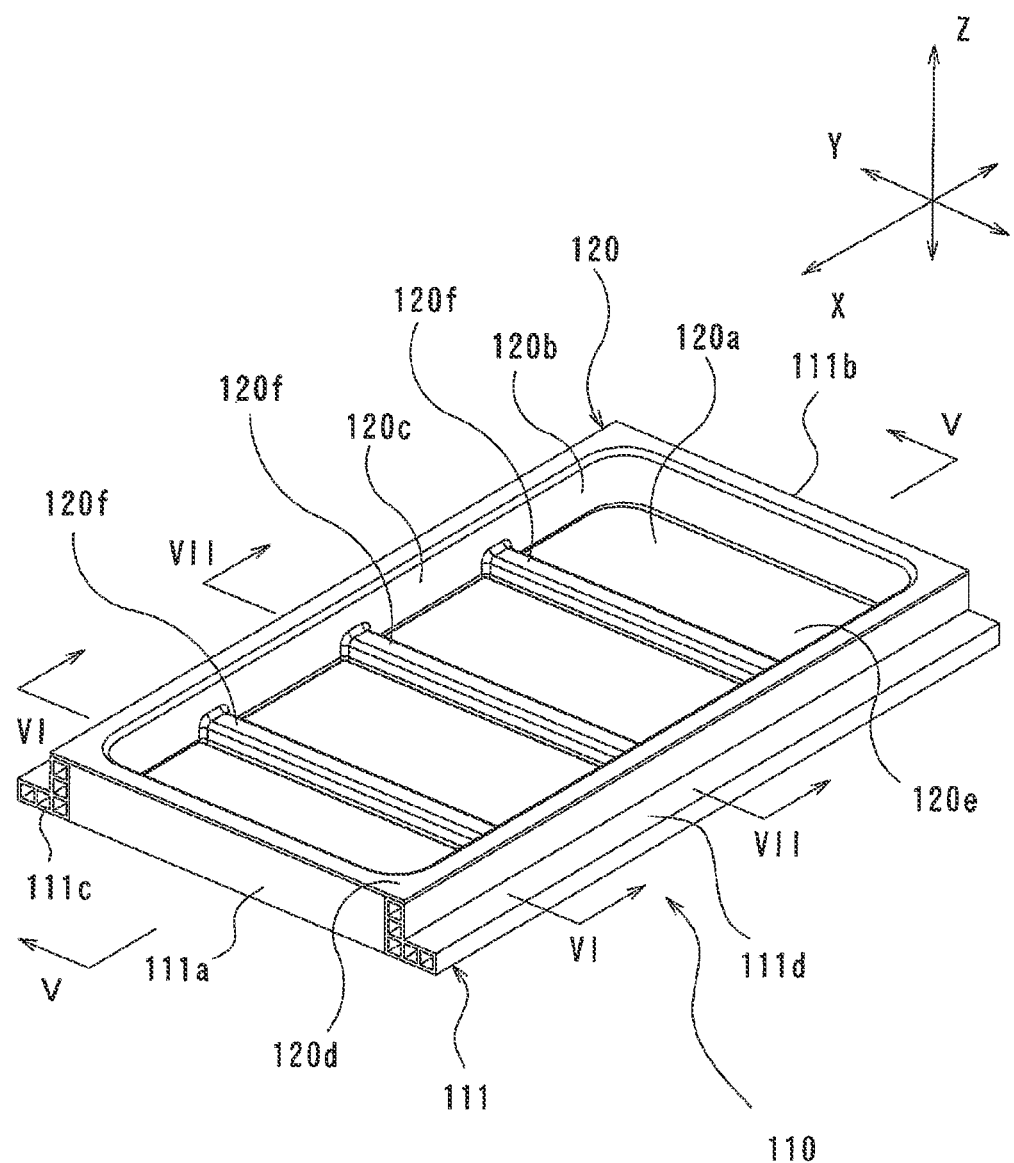
FIG. 3 is a perspective view of an electric vehicle battery case.
Figure 4:
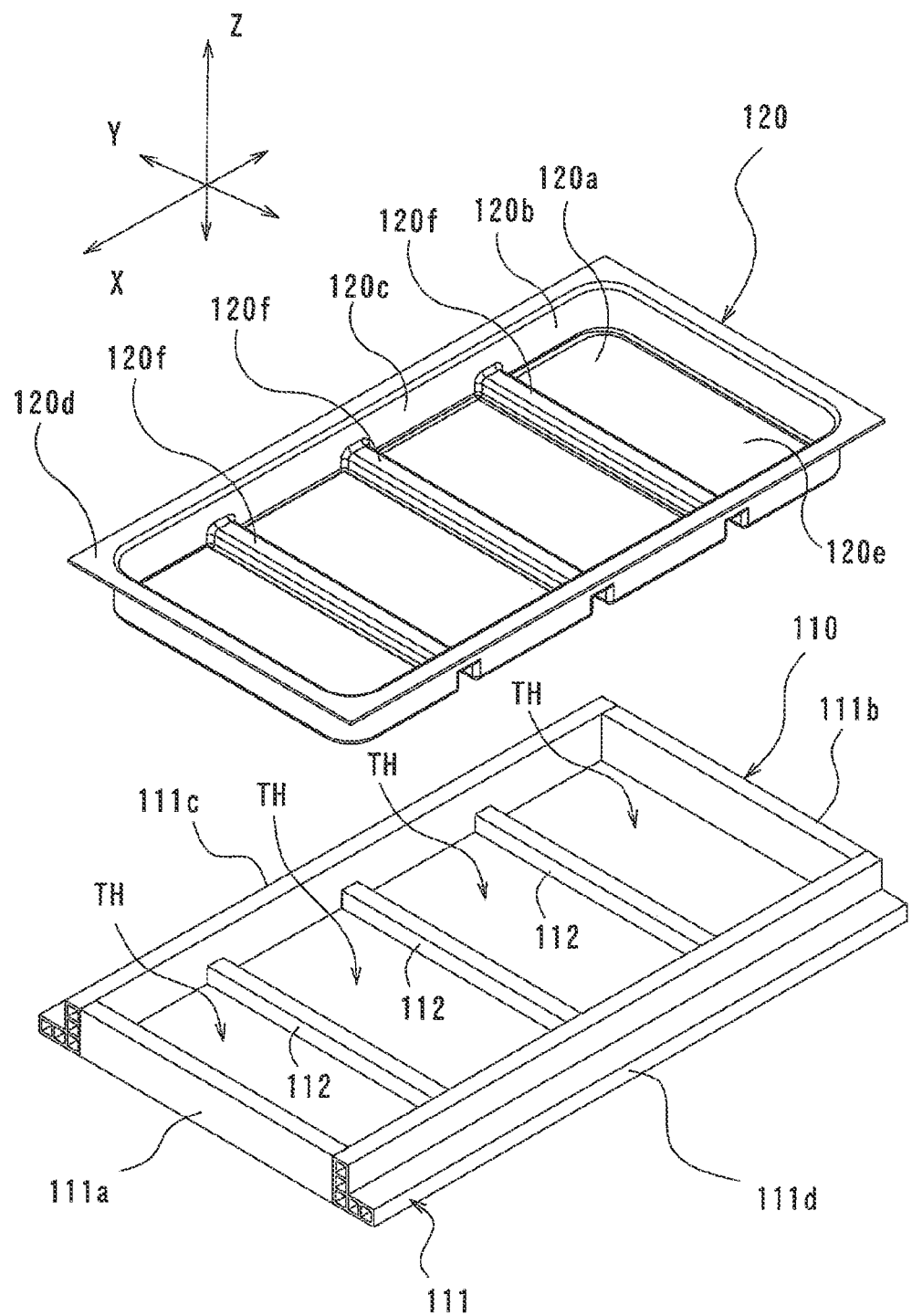
FIG. 4 is an exploded perspective view of an electric vehicle battery case.

Referring to FIG. 2, the battery case 100 is disposed inside a pair of rocker members 200 being framework members in the vehicle width direction, and is supported by these rocker members 200. Each rocker member 200 extends in the vehicle front-rear direction below the end portions in the vehicle width direction of the electric vehicle 1 (see FIG. 1). The rocker member 200 is formed by bonding a plurality of metal plates, and has a function of protecting the vehicle interior R and the battery case 100 against impact from the side of the electric vehicle 1.

Referring also to FIGS. 3 to 7, the battery case 100 includes a frame 110 that defines a through hole or a through space TH being an example of a space inside, a tray 120 having a bathtub shape, and a top cover 130 and an under cover 140 disposed so as to sandwich them from above and below.

The frame 110 is a frame-shaped member forming the framework of the battery case 100. The frame 110 is made of, for example, an aluminum alloy extruded product, an aluminum alloy cast product, a magnesium alloy extruded product, a magnesium alloy cast product, or a combination thereof. Since the frame 110 is made of an aluminum-based or magnesium-based material, it is possible to reduce the weight of the frame while securing strength. In particular, the frame 110 can be manufactured by joining a plurality of extruded hollow members made of a 6000 series aluminum alloy by arc welding. In this case, the aluminum alloy may be 7000 series.

The frame 110 may be a steel plate roll form material, a steel plate press component, or a combination thereof. By forming the frame 110 with a steel member, it is possible to increase the strength of the frame while suppressing the cost.

When the frame 110 is manufactured by joining a plurality of members, means suitable for materials such as friction stir welding (FSW), laser welding, electron beam welding, resistance spot welding, self piercing rivet (SPR), and Flow Drill Screw (FDS) can be adopted in addition to the arc welding described above.

The frame 110 in the present embodiment includes a frame-shaped body 111 having a rectangular frame shape in plan view, and three cross members 112 extending in the vehicle width direction so as to cross the through space TH in the lower part of the frame-shaped body 111. It should be noted that in the present embodiment, the frame 110 having the through space TH will be described as an example, but the shape of the frame 110 is not particularly limited. For example, the frame 110 may define a hollow portion having a recessed shape or a bottomed shape as a space replacing the through space TH.

Figure 5:
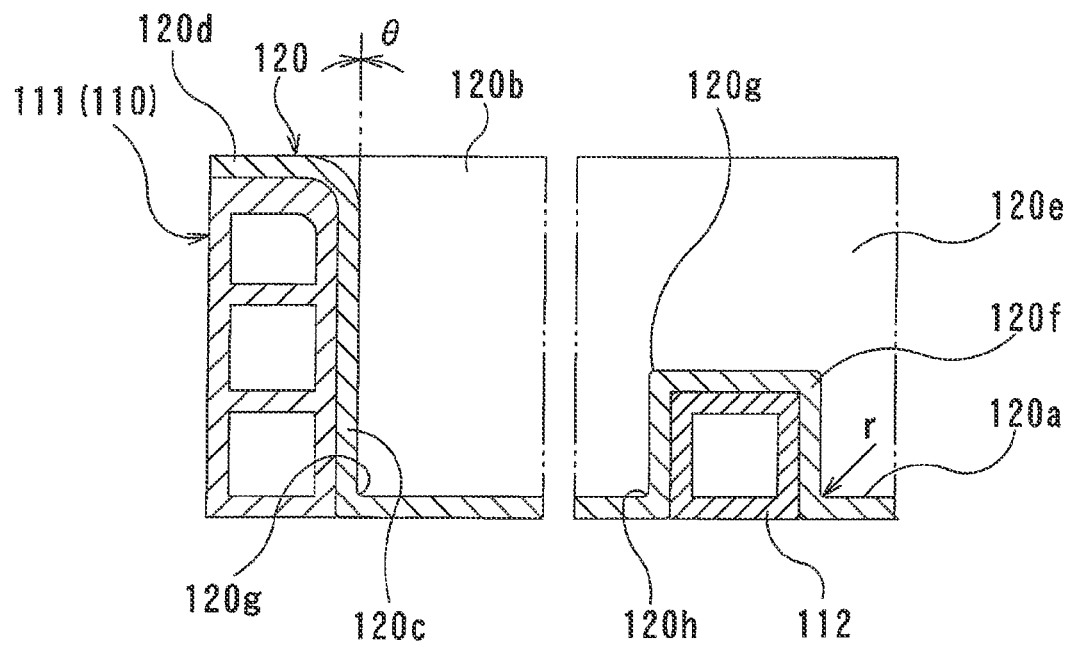
FIG. 5 is a cross-sectional view taken along line V-V in FIG. 3.
Figure 6:
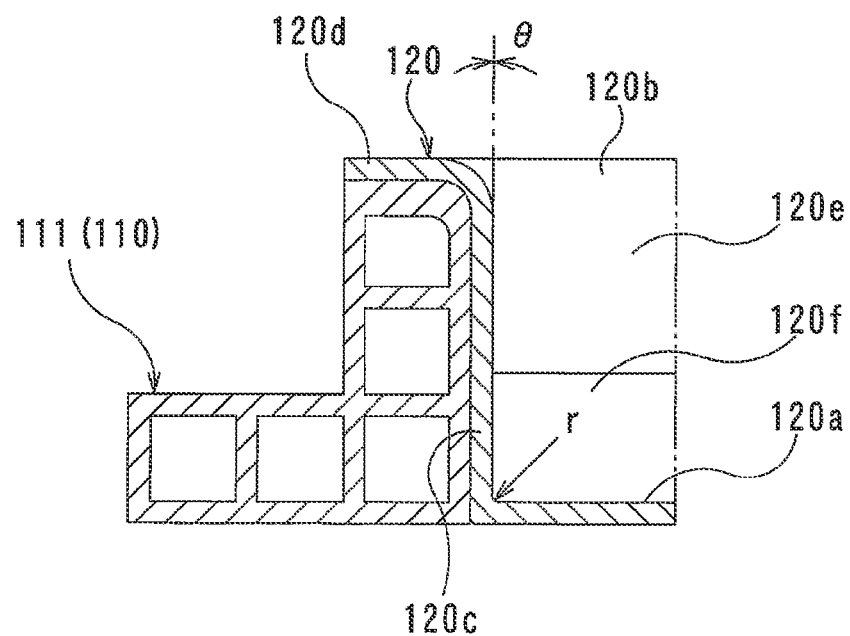
FIG. 6 is a cross-sectional view taken along line VI-VI in FIG. 3.
Figure 7:
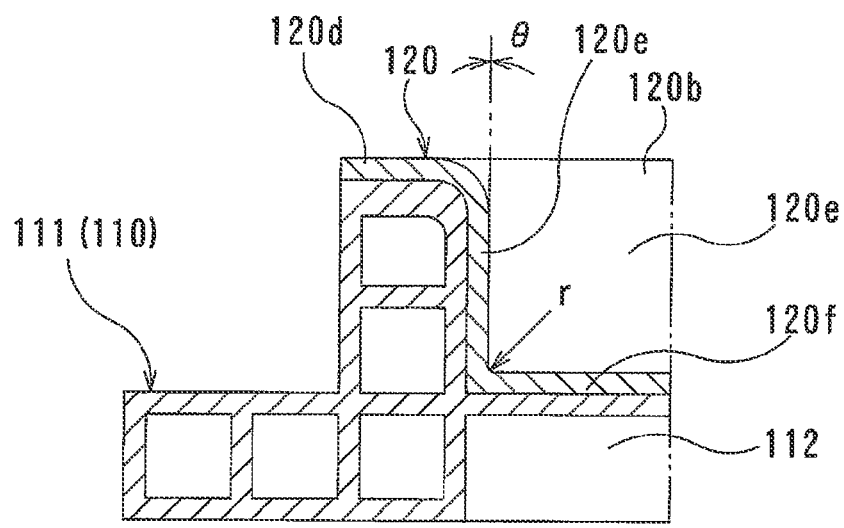
FIG. 7 is a cross-sectional view taken along line VII-VII in FIG. 3.

The frame-shaped body 111 includes side walls 111c and 111d extending in the vehicle front-rear direction, and a front wall 111a and a rear wall 111b connecting the side walls and extending in the vehicle width direction. As shown in FIGS. 6 and 7, the outer contours of the side walls 111c and 111d are substantially L-shaped in a cross section perpendicular to the vehicle front-rear direction. The inside of each of the side walls 111c and 111d is partitioned into a plurality of chambers extending in the longitudinal direction to have a hollow shape. As shown in FIG. 5, the outer contours of the front wall 11a and the rear wall 111b have a quadrangular tubular shape in a cross section perpendicular to the vehicle width direction, and each of the insides of the front wall 111a and the rear wall 111b is also similarly partitioned into a plurality of chambers extending in the longitudinal direction to have a hollow shape. The outer contours of the side walls 111c and 111d may have a shape other than the L-shape, such as a quadrangular tubular shape, in a cross section perpendicular to the vehicle front-rear direction. In addition, the side walls 111c and 111d may be solid. The outer contours of the front wall 111a and the rear wall 111b may have a shape other than a quadrangular tubular shape, such as an L shape, in a cross section perpendicular to the vehicle width direction. In addition, the front wall 111a and the rear wall 111b may be solid.

The three cross members 112 are provided at substantially equal intervals in parallel with the front wall 111a and the rear wall 111b, and each of the three cross members 112 connects the side wall 111c and the side wall 111d. The cross member 112 has a function of improving the strength of the battery case 100. In particular, the cross member 112 can improve strength against collision from the side of the electric vehicle 1 (see FIG. 1). However, the cross member 112 is not an essential configuration, and may be omitted as necessary. In addition, also in the case of installing the cross member 112, a mode thereof is not particularly limited, and the shape, arrangement, number, and the like can be optionally set.

The tray 120 is made of thermoplastic resin. The tray 120 may be made of a thermoplastic resin such as polyethylene or polypropylene containing no reinforcement fiber. In addition, the tray 120 may be made of thermoplastic fiber-reinforced resin. More specifically, the thermoplastic fiber-reinforced resin that can be adopted as the material of the tray 120 includes GFRP (the reinforcement fiber is a glass fiber), CFRP (the reinforcement fiber is a carbon fiber), and CNFRP (the reinforcement fiber is a cellulose nanofiber). By setting the tray 120 as made of a fiber-reinforced resin, it is possible to improve the strength of the tray 120 while securing the weight reduction in the tray 120.

The tray 120 includes a bottom wall 120a, a peripheral wall 120c that defines an opening portion 120b on the opposite side from the bottom wall 120a provided on the peripheral edge of the bottom wall 120a, that is, on the tip side, and a flange 120d that extends in the horizontal direction (X, Y directions) and spreads outward provided at the tip of the peripheral wall 120c. That is, the tray 120 has a bathtub shape. The battery 30 is housed in a housing portion 120e being a space surrounded by the bottom wall 120a and the peripheral wall 120c. The bottom wall 120a is provided with a projecting portion 120f projecting toward the opening portion 120b and having a shape complementary to the cross member 112.

Referring to FIGS. 2, 3, and 5 to 7, the tray 120 is joined by press-fitting to the frame 110 by a pressure forming method to be integrated with the frame 110 as described in detail below. Specifically, the bottom wall 120a of the tray 120 is positioned in the lower part of the through space TH, and the outer surface of the peripheral wall 120c of the tray 120 is in close contact with or in pressure contact with the inner surface of the frame-shaped body 111. In addition, a lower surface of the projecting portion 120f is in close contact with or in pressure contact with the cross member 112. The flange 120d of the tray 120 is placed on the upper surface of the frame-shaped body 111.

Referring to FIG. 2, the opening portion 120b of the tray 120 is closed by the top cover 130. In other words, the housing portion 120e in which the battery 30 is housed is a closed space by the bottom wall 120a of the tray 120, the peripheral wall 120c of the tray 120, and the top cover 130. The top cover 130 and the flange 120d of the tray 120 are jointly fastened and fixed to the frame-shaped body 111 of the frame 110 by a screw. Above the top cover 130, a floor panel 300 constituting a floor surface of the vehicle interior R and a floor cross member 400 extending in the vehicle width direction in the vehicle interior R are disposed. In addition, an under cover 140 is disposed below the tray 120. The under cover 140 is screwed to the frame 110 and supports the tray 120 from below. The top cover 130 and the under cover 140 may be fastened to other members by a method other than a screw, such as a rivet, a bolt, or an adhesive.

Since the tray 120 has a bathtub shape and has no seam, the sealing performance can be improved, and since the frame and the tray are integrated by joining by press-fitting by a pressure forming method without being welded, highly-accurate joining is achieved without causing dimensional change due to thermal deformation. In addition, since the tray 120 is made of resin as described above, the weight of the electric vehicle battery case 1 can be further reduced as compared with the case where the tray 120 is made of metal. Furthermore, since the tray 120 is made of resin, the degree of freedom of the shape of the tray is high.

Referring to FIGS. 5 to 7, since the tray 120 is joined by press-fitting by a pressure forming method, omission of a draft angle (inclination of the peripheral wall 120c) which is difficult, for example, in the cold press forming of metal and reduction in the roundness of the ridgeline portion or the corner portion are enabled, and it is possible to form the tray 120 having any shape. Specifically, in the case of the present embodiment, all of the peripheral walls 120c are substantially orthogonal to the bottom wall 120a, and the draft angle θ is 0 degrees. In addition, in the case of the present embodiment, the radius r of each of the ridgeline portion 120g and the corner portion 120h is about 1 mm to 20 mm, except for the portion where the round shape is formed of the inner upper portion of the frame-shaped body 111 of the frame 120. As described above, omitting the draft angle θ in the tray 120 and reducing the roundness of the ridgeline portion 120g and the corner portion 120h allows the space efficiency of the battery case 100 to be improved and the battery 30 having a larger capacity to be mounted.

Next, a method for manufacturing the battery case 100 of the present embodiment will be described with reference to FIGS. 8 to 11.

Figure 8:
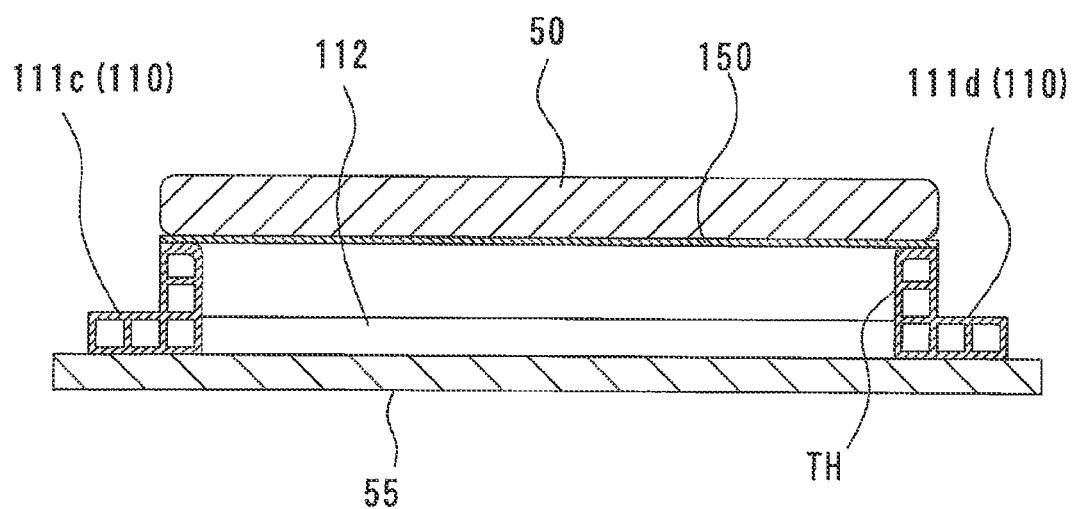
FIG. 8 is a schematic cross-sectional view for illustrating the method for manufacturing an electric vehicle battery case according to the first embodiment.

Referring to FIG. 8, a flat plate (member to be machined) 150 made of thermoplastic resin, to serve as a tray 120 in a finished product, is prepared. Examples of a method for manufacturing the flat plate 150 include the following. First, in the case of a thermoplastic resin containing no reinforcement fiber, or GFRP, injection molding using pellets can be adopted. In the case of GFRP or CFRP (short fiber), hot pressing using sheet molding compound (SMC) can be adopted. Furthermore, in the case of CFRP (continuous fiber), resin transfer molding (RTM) using a woven fabric of reinforcement fibers, and a resin, or prepreg compression molding (PCM) of a prepreg sheet can be adopted.

Figure 9:
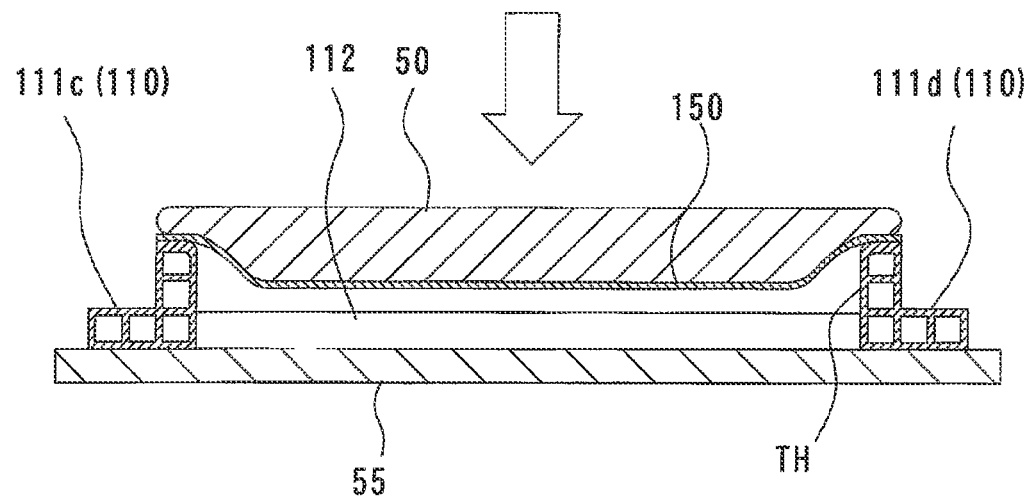
FIG. 9 is a schematic cross-sectional view for illustrating the method for manufacturing an electric vehicle battery case according to the first embodiment.
Figure 10:
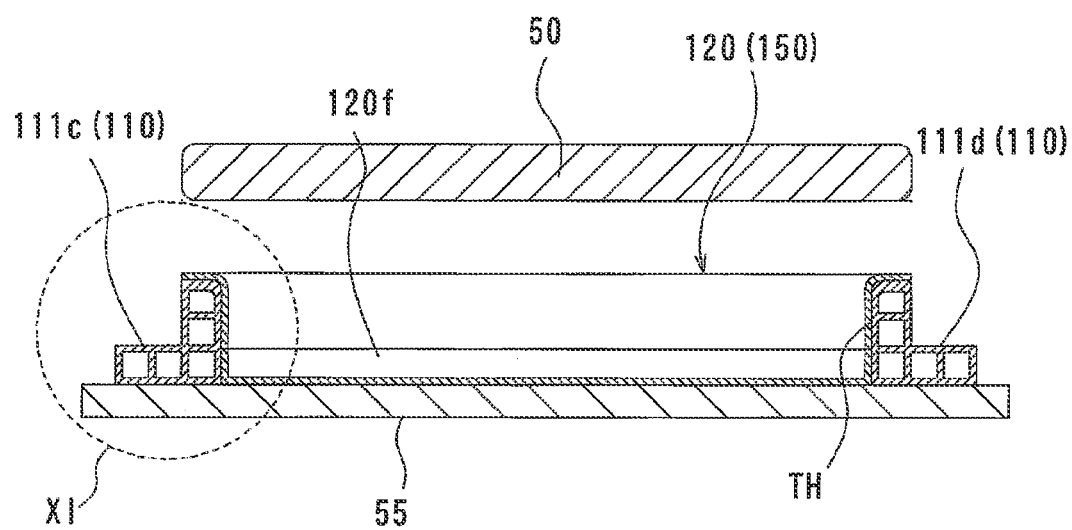
FIG. 10 is a schematic cross-sectional view for illustrating the method for manufacturing an electric vehicle battery case according to the first embodiment.
Figure 11:
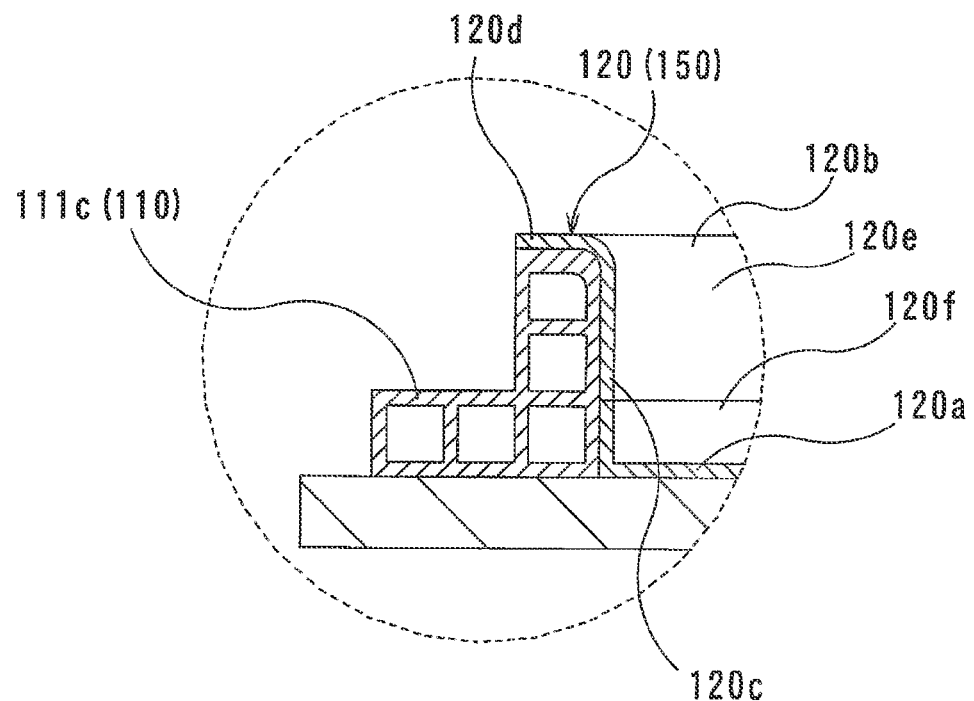
FIG. 11 is an enlarged view of a portion XI in FIG. 10.

Next, referring to FIGS. 9 to 11, the frame 120 is placed on a table 55 having a flat upper surface. In addition, the flat plate 150 is superposed and disposed on the frame 120 placed on the table 55. In this state, pressure is applied to the flat plate 150 from the opposite side from the frame 110 to press the flat plate 150 against the frame 110, thereby causing the flat plate 150 to swell into the through space TH. This swelling deforms the flat plate 150 into a bathtub shaped tray 120 including a bottom wall 120a, a peripheral wall 120c, and a flange 120d. The tray 120 is joined by press-fitting to the frame 120 when being deformed from the flat plate 150 by pressurization. This integrates the tray 120 and the frame 110 as most clearly shown in FIGS. 5 to 7.

When pressure is applied to the flat plate 150 from the opposite side from the frame 110, the flat plate 150 is heated. Since the flat plate 150 has thermoplasticity, plasticity is improved by heating. As a result, the flat plate 150 can be more reliably deformed into a desired bathtub shape by applying pressure. Examples of a method for heating the flat plate 150 include the following. First, hot air may be blown onto one or both of the flat plate 150 and the frame 110. The flat plate 150 and the frame 110 may be housed together with the table 55 in a heating furnace heated to a high temperature by a heater. Furthermore, the frame 110 may be heated by electromagnetic induction.

In the present embodiment, pressurization of the flat plate 150 is performed by a pressure forming method. Here, the pressure forming method refers to a method of forming a member by gas or liquid pressure. In the present embodiment, in the pressure forming method, the hydraulic transfer elastic body 50 that is elastically deformable using the pressure of the liquid is used. Although not shown in detail, the hydraulic transfer elastic body 50 may have a structure in which only a lower surface of a metal chamber containing a liquid such as water or oil is closed with a rubber plate, for example. The rubber plate is elastically deformed by adjusting the pressure of the liquid, and forming can be performed without the liquid coming into direct contact with the flat plate 150.

Referring to FIG. 10, when the pressurizing force of a pressing machine (not shown) is released after the flat plate 150 is deformed into the bathtub-shaped tray 120, the hydraulic transfer elastic body 50 returns to a shape in the natural state. Therefore, the hydraulic transfer elastic body 50 can be easily removed from the inside of the tray 120. After the hydraulic transfer elastic body 50 is removed, the battery case 100 is formed by joining the top cover 130 and the under cover 140 as shown in FIG. 2.

It should be noted that in the present embodiment, the front wall 11a, the rear wall 111b, and the side walls 111c and 111d have wall thicknesses of the upper portions set to be larger than those of the other portions. The upper portions of the front wall 111a, the rear wall 111b, and the side walls 111c and 111d are portions susceptible to force due to the forming described above, and the wall thicknesses of the portions are increased to prevent unintended deformation. In addition, the inner upper portions of the front wall 111a, the rear wall 111b, and the side walls 111c and 111d are formed in a round shape, which promotes the inflow of the material to the inside of the flat plate 150 in the forming.

In the manufacturing method of the present embodiment, the resin flat plate 150 can be formed into the bathtub shaped tray 120 and integrated with the frame 110 at the same time. Since the flat plate 150 is formed into the bathtub shaped tray 120 by pressurization, there is no seam in the tray 120, and high sealing performance can be secured. In addition, since forming of the flat plate 150 into a bathtub shape and joining by press-fitting of the flat plate 150 to the frame 110 are simultaneously performed, the joining step can be simplified. Since the tray 120 is joined by press-fitting to the frame 110 instead of welding, it is possible to achieve highly accurate joining without causing thermal deformation. Therefore, sufficient sealing performance of the battery case 100 can be secured, and the tray 120 obtained by forming the flat plate 150 into a bathtub shape and the frame 110 can be simply and highly accurately joined.

By adopting the pressure forming method for pressurizing the flat plate 150, omission of a draft angle θ which is difficult, for example, in the general cold press forming of metal and reduction in the roundness of the ridgeline portion 120g and the corner portion 120h are enabled, and the degree of freedom of the shape of the tray 120 having a bathtub shape is increased. In addition, omitting the draft angle θ and reducing the roundness of the ridgeline portion 120g and the corner portion 120h allows the space efficiency of the tray 120 to be improved and the battery 30 having a larger capacity to be mounted.

By adopting a pressure forming method using a hydraulic transfer elastic body for pressurizing the flat plate 150, a liquid to which pressure is applied does not scatter or leak. If the hydraulic transfer elastic body is not used in the pressure forming method, since the flat plate 150 is directly deformed by a fluid held at a high pressure, it is necessary to strongly constrain the outer edge portion of the flat plate 150 so that the fluid does not scatter or leak to the outside. However, when the hydraulic transfer elastic body is used, since the liquid to which the force is applied does not scatter or leak, the constraint force on the outer edge portion of the flat plate 150 can be reduced. Therefore, when the flat plate 150 is formed into a bathtub shape, the material amount flowing from the outer edge portion to the inside can be increased, and stable machining can be achieved by suppressing cracking or the like of the member to be formed. In addition, since it is not necessary to completely seal the outer edge portion of the flat plate 150, maintenance of the pressing machine becomes easy, and productivity can be improved.

FIGS. 12 to 15 show modifications of the present embodiment. These modifications can also be applied to the second and third embodiments described below.

Figure 12:
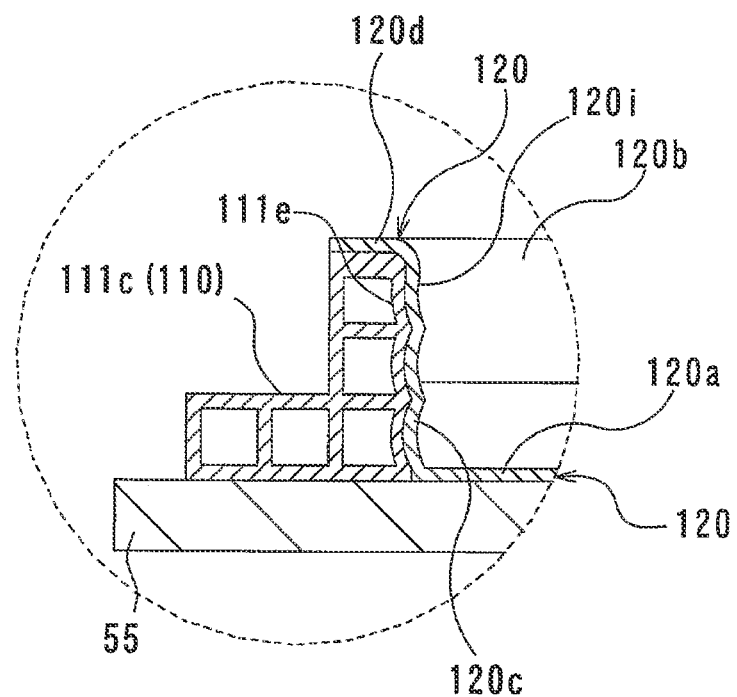
FIG. 12 is a cross-sectional view similar to FIG. 11 showing a first alternative of the first embodiment.

In the modification shown in FIG. 12, when the flat plate 150 is formed into the tray 120 having a bathtub shape, negative angle forming for at least partially forming a negative angle from the bottom wall 120a toward the opening portion 120b of the tray 120 is performed. Here, the negative angle is a term often used in the forming field using a die, and indicates that the die draft angle in the formed member is less than zero (negative). In this modification, the frame-shaped body 111 of the frame 110 having no negative angle portion in advance and the flat plate 150 are integrally deformed by pressurization from the hydraulic transfer elastic body 50 to form a negative angle, whereby negative angle forming is performed. Specifically, the inner surface of the frame-shaped body 111 is deformed outward for each chamber, the peripheral wall 120c of the tray 120 is also deformed outward, and the negative angle portions 111e and 120i are formed.

In the modification in FIG. 12, since the negative angle portions 111e and 120i are formed when the flat plate 150 is formed into the tray 120 having a bathtub shape, it is possible to prevent the joining by press-fitting of the tray 120 to the frame 110 from being released by the negative angle portions 111e and 120i. Therefore, the joining strength between the frame 110 and the tray 120 having a bathtub shape is increased by the negative angle forming. In particular, the negative angle forming is forming peculiar to a pressure forming method because in cold press forming requiring a draft angle using a normal die, there is a problem that a cam mechanism needs to be added and a die structure becomes complicated.

Figure 13:
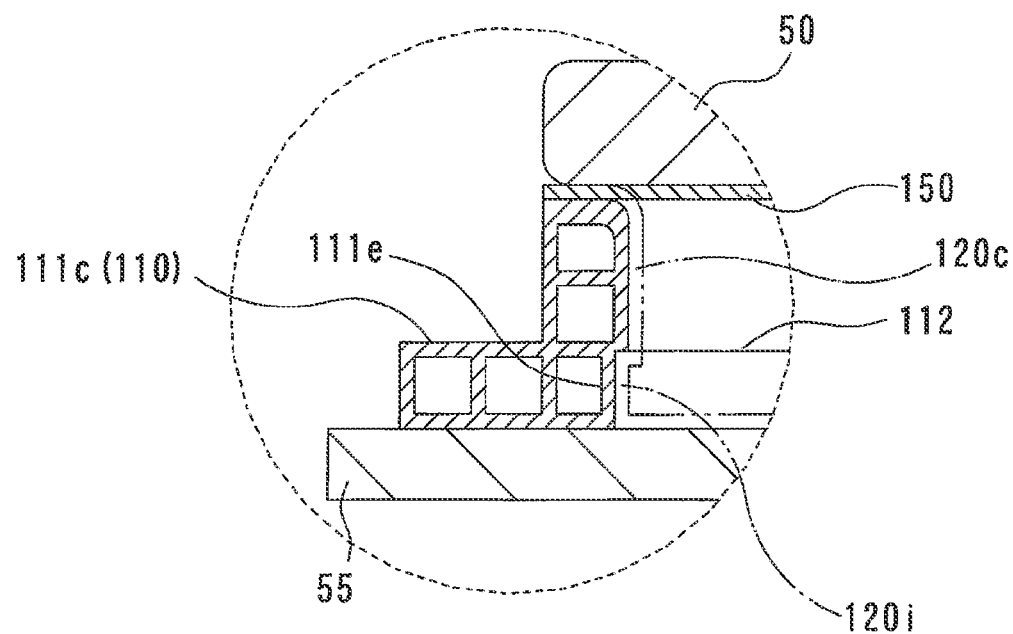
FIG. 13 is a cross-sectional view similar to FIG. 11 showing a second alternative of the first embodiment.
Figure 14:
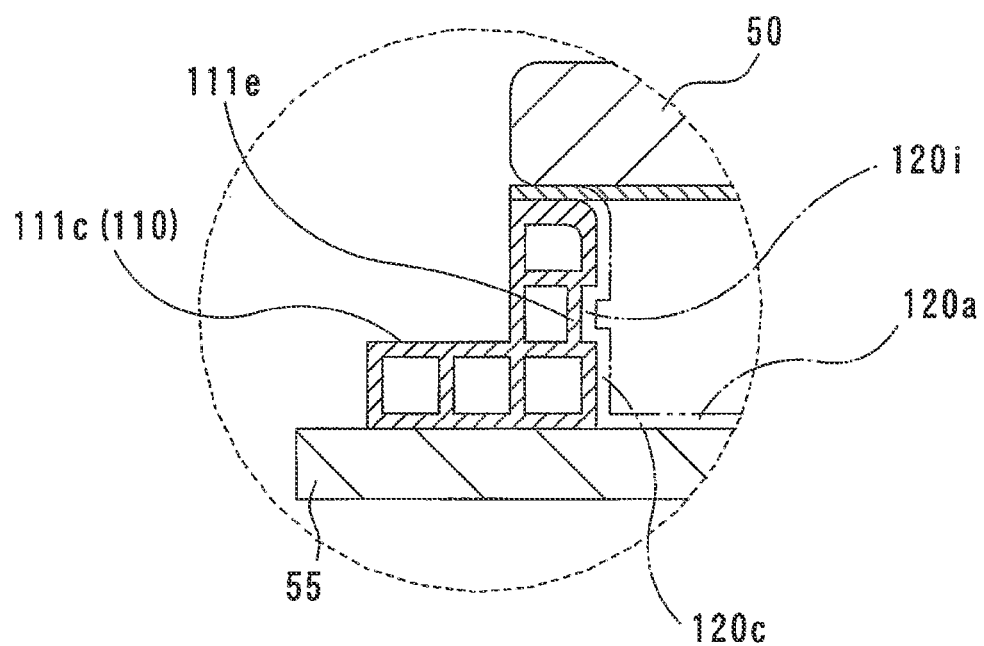
FIG. 14 is a cross-sectional view similar to FIG. 11 showing a third alternative of the first embodiment.
Figure 15:
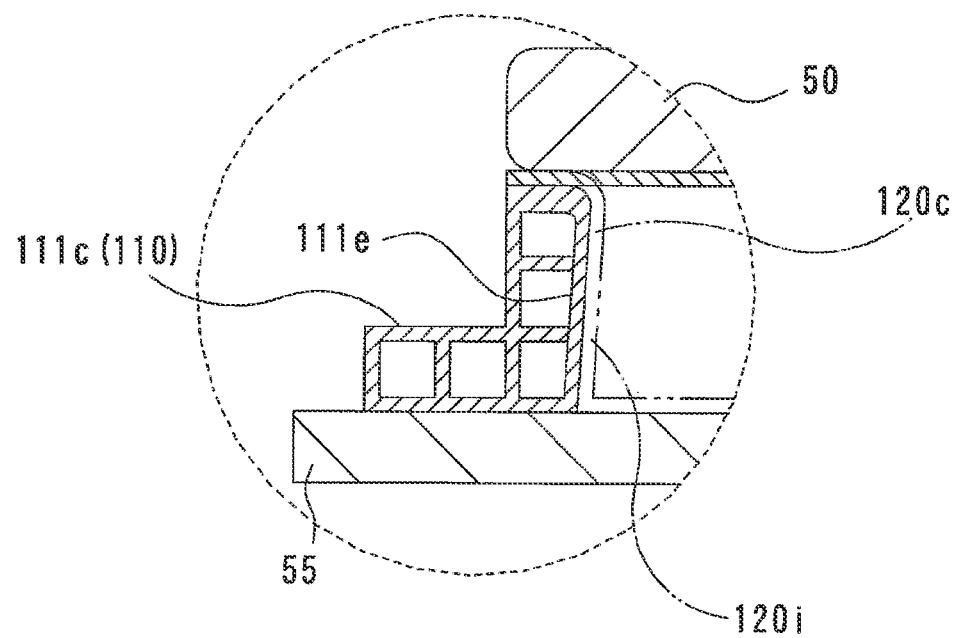
FIG. 15 is a cross-sectional view similar to FIG. 11 showing a fourth alternative of the first embodiment.

In the modifications in FIGS. 13 to 15, the negative angle portion 111e is formed in advance in the frame-shaped body 111 of the frame 110. In this case, the negative angle forming is performed by pressing the flat plate 150 against the negative angle portion 111e of the frame-shaped body 111 formed in advance. In the modification in FIG. 13, a negative angle portion 111e is provided as a recess at a position on the lower end side in the diagram of the inner surface of the frame-shaped body 111. In the modification in FIG. 14, a negative angle portion 111e is provided as a recess at an intermediate position in the height direction in the diagram of the inner surface of the frame-shaped body 111. In the modification in FIG. 15, the inner surface of the frame-shaped body 111 is inclined toward the center of the frame 110, thereby forming the negative angle portion 111e as an inclined surface. Thus, by providing the negative angle portion 111e in the frame-shaped body 111 of the frame 110 in advance, the negative angle forming can be easily and reliably performed. The negative angle portion may also be formed in the cross member 112.

In the following, second and third embodiments of the present invention will be described. In these embodiments, the structure of the battery case 100 to be finally manufactured is similar to that of the first embodiment except for the points to be particularly referred to. In addition, the method for manufacturing a battery case in these embodiments is also similar to that of the first embodiment except for the points to be particularly referred to.

Second Embodiment

Figure 16:
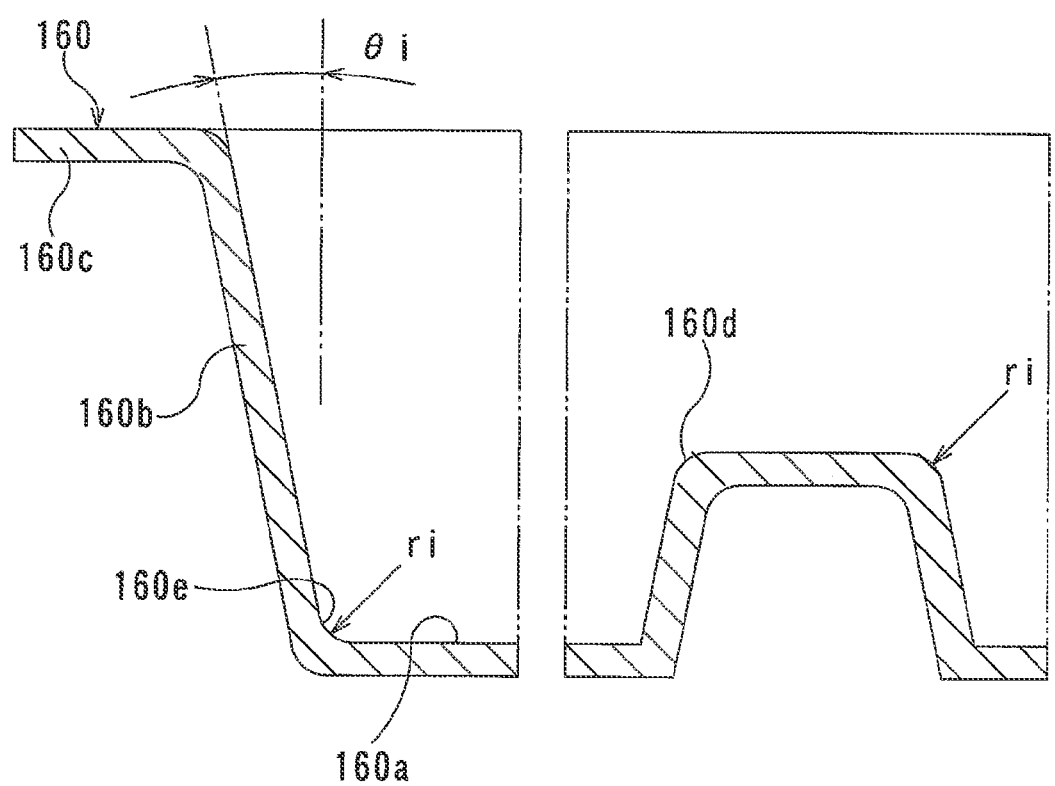
FIG. 16 is a cross-sectional view similar to FIG. 5 showing a primary molded member in a second embodiment of the present invention.
Figure 17:
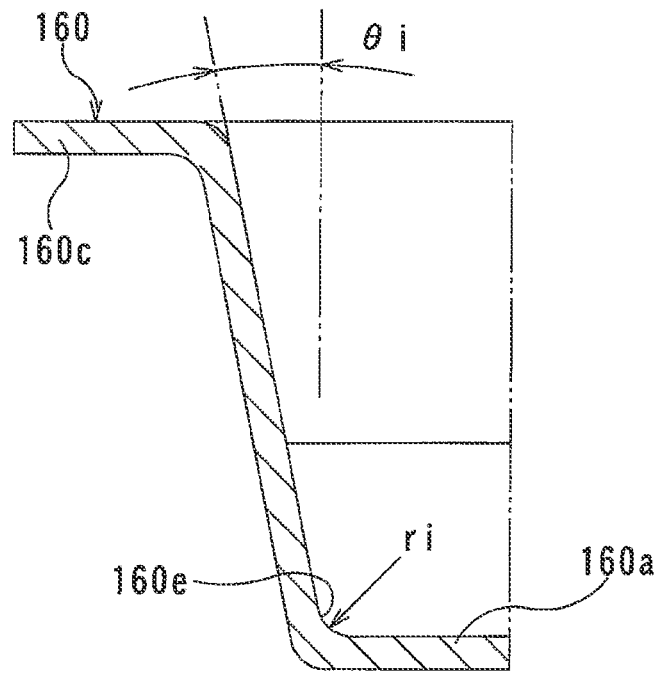
FIG. 17 is a cross-sectional view similar to FIG. 6 showing a primary molded member in the second embodiment.
Figure 18:
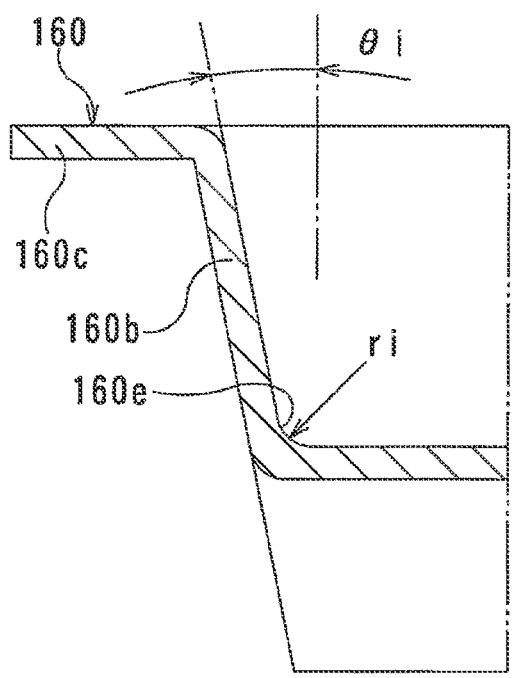
FIG. 18 is a cross-sectional view similar to FIG. 7 showing a primary molded member in the second embodiment.

Referring to FIGS. 16 to 18, in the method for manufacturing the battery case 100 according to the present embodiment, a primary molded article (member to be machined) 160 made of thermoplastic resin having a bathtub shape close to a tray 120 being a finished product is prepared. In the present embodiment, the primary molded article 160 includes a bottom wall 160a, a peripheral wall 160b provided at a peripheral edge of the bottom wall 160a, and a flange 160 c provided at a tip of the peripheral wall 160b. The draft angle $\theta i$ of the primary molded article 160 is not 0 degrees unlike the draft angle $\theta$ (FIGS. 5 to 7) of the tray 120 being a finished product. That is, in the tray 120 of the finished product, the peripheral wall 120c is not inclined, whereas the peripheral wall 160b of the primary molded article 160 is inclined. In addition, the radius ri of the ridgeline portion 160d and the corner portion 160e of the primary molded article 160 is about 5 mm to 70 mm, and is larger than the radius r (FIGS. 5 to 7) of the ridgeline portion 120g and the corner portion 120h in the tray 120 of the finished product.

Examples of a method for manufacturing the primary molded article 160 include the following. First, in the case of a thermoplastic resin containing no reinforcement fiber, or GFRP, injection molding using pellets can be adopted. In the case of GFRP or CFRP (short fiber), hot pressing using SMC can be adopted. Furthermore, in the case of CFRP (continuous fiber), RTM using a woven fabric of reinforcement fibers, and a resin, or PCM of a prepreg sheet can be adopted.

Figure 19:
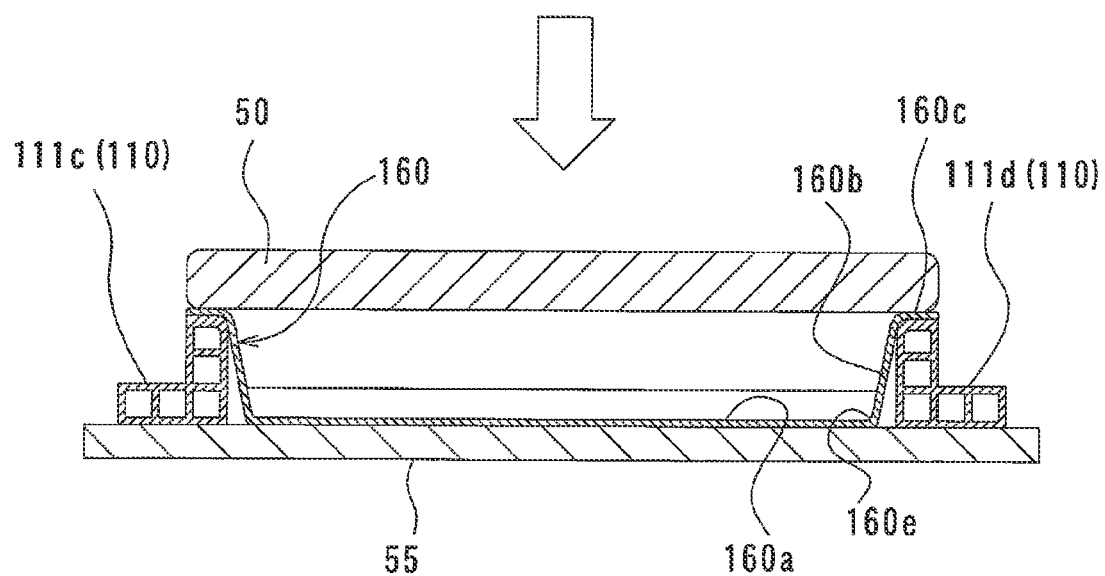
FIG. 19 is a schematic cross-sectional view for illustrating a pressure forming step in the second embodiment.

Referring to FIG. 19, the primary molded article 160 is superposed and disposed on the frame 110 so that the flange 160c is disposed on the upper surface of the frame-shaped body 111 of the frame 110 and the bottom wall 160a and the peripheral wall 160b are positioned in the through space TH. Thereafter, while the primary molded article 160 is heated, pressure is applied to the primary molded article 160 from the opposite side from the frame 110 by a pressure forming method using the hydraulic transfer elastic body 50, and the primary molded article 160 is pressed against the frame 110 to be caused to swell into the through space TH. The swelling deforms the primary molded article 160 into a tray 120 having a bathtub shape, and the tray 120 is joined by press-fitting to the frame 110 at the same time.

In the present embodiment, the primary molded article 160 molded in advance into a shape similar to that of the tray 120 is used for deformation into the bathtub shaped tray 120, and for joining by press-fitting to the frame 110, due to application of pressure. That is, the deformation into the tray 120 is performed stepwise in two steps. Therefore, since the amount of strain applied to the primary molded article 160 is reduced as compared with the case where only applying pressure to the flat plate causes the flat plate to be deformed into the tray 120 and causes the tray 120 to be joined by press-fitting to the frame 110, reduction in local wall thickness can be suppressed.

Third Embodiment

Figure 20:
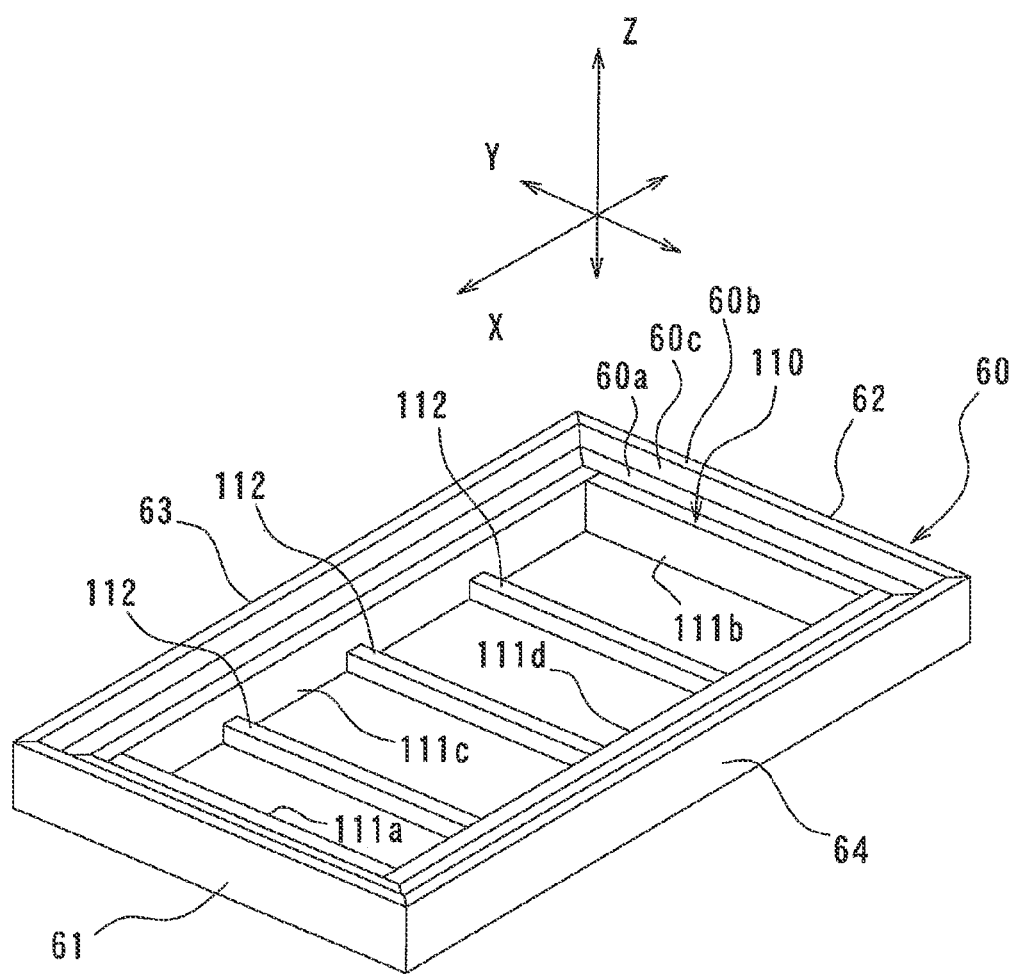
FIG. 20 is a perspective view showing a state in which a constraining die used in a method for manufacturing an electric vehicle battery case according to a third embodiment of the present invention is attached to a frame.
Figure 21:
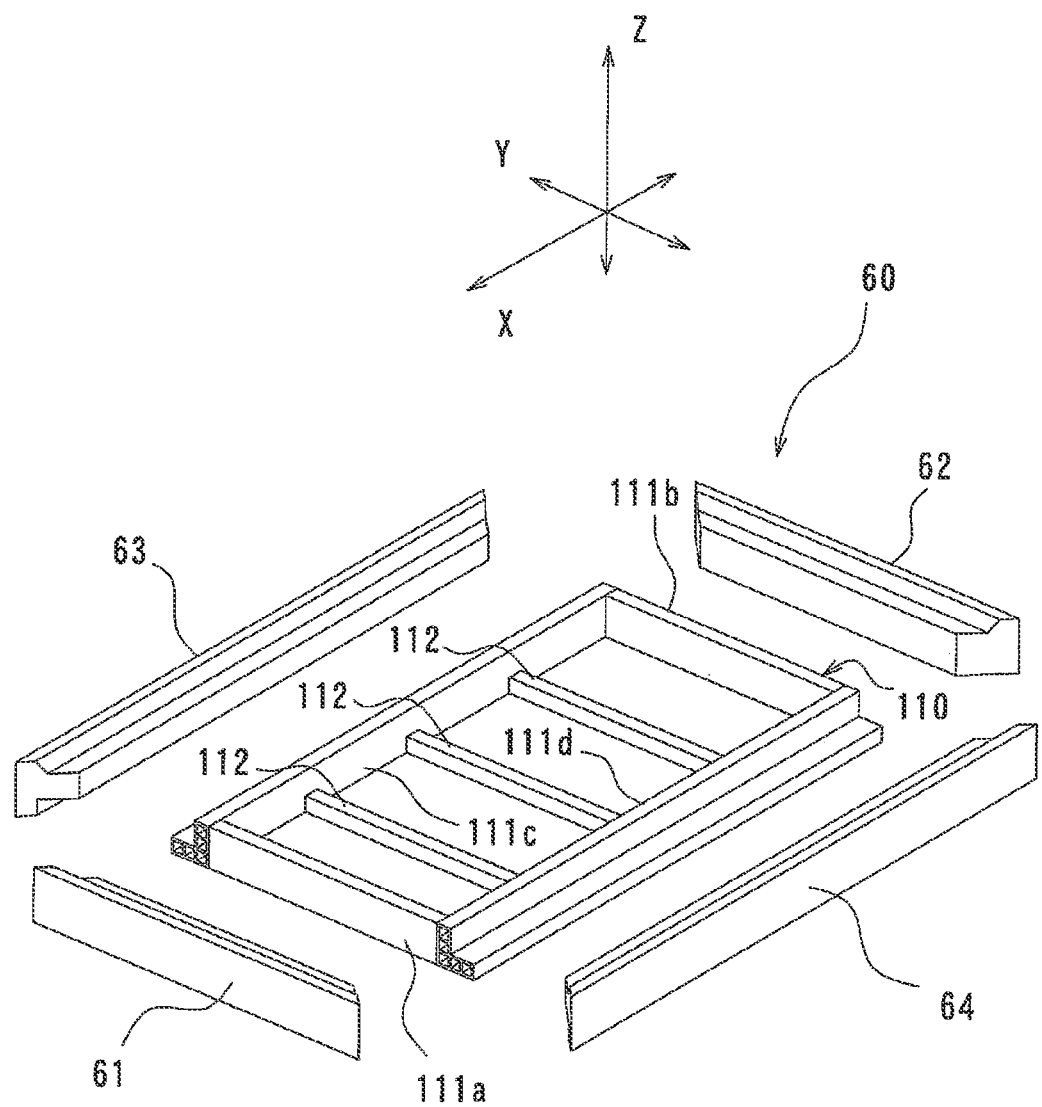
FIG. 21 is an exploded perspective view of the constraining die used in the method for manufacturing an electric vehicle battery case according to the third embodiment.

Referring to FIGS. 20 and 21, in the present embodiment, a constraining die 60 that constrains the position of the frame 110 when the flat plate 150 is pressurized by the pressure forming method is used. The constraining die 60 can also be used when the target of pressurization by the pressure forming method is the primary molded article 160 of the second embodiment.

The constraining die 60 has a shape complementary to that of the frame 110 and is disposed outside the frame 110. The constraining die 60 includes a front constraining member 61 and a rear constraining member 62 that respectively support the front wall 111a and the rear wall 111b, and side constraining members 63 and 64 that respectively support the side walls 111c and 111d. The front constraining member 61, the rear constraining member 62, and the side constraining members 63 and 64 are combined to form a frame shape in plan view. The upper surface of the constraining die 60 has a two-step shape. Specifically, the upper surface of the constraining die 60 has a first surface 60a aligned at substantially the same height as the upper surface of the frame 110 and a second surface 60b provided one step higher than the upper surface of the frame 110. The first surface 60a and the second surface 60b are connected by an inclined surface 60c, and the second surface 60b is disposed outside the first surface 60a in plan view. In addition, the lower surfaces of the frame 110 and the constraining die 60 are aligned. Therefore, when the height dimensions of the frame 110 and the constraining die 60 are compared, the height of the constraining die 60 is set larger than the height of the frame 110.

In the method for manufacturing the battery case 100 of the present embodiment, in addition to the first embodiment, the constraining die 60 that constrains the movement of the frame 110 is further prepared, and the constraining die 60 is fixed and disposed outside the frame 110 in plan view (see FIG. 20). Thereafter, as shown in FIGS. 22 to 24, the flat plate 150 is deformed into a bathtub tray 120 and integrated with the frame 110 as in the first embodiment.

Figure 22:
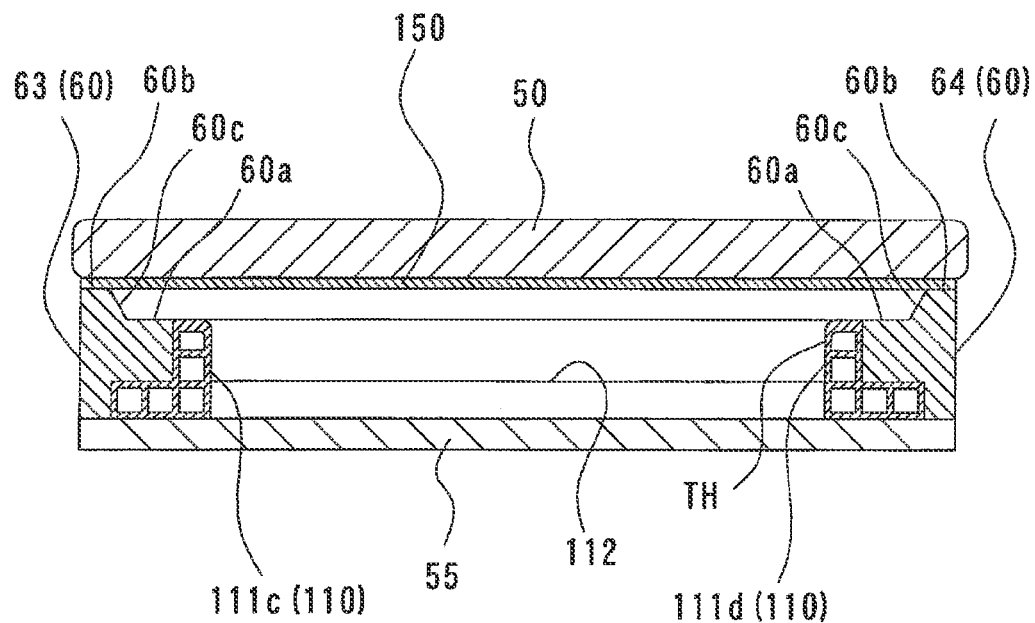
FIG. 22 is a schematic cross-sectional view for illustrating the method for manufacturing an electric vehicle battery case according to the third embodiment.
Figure 23:
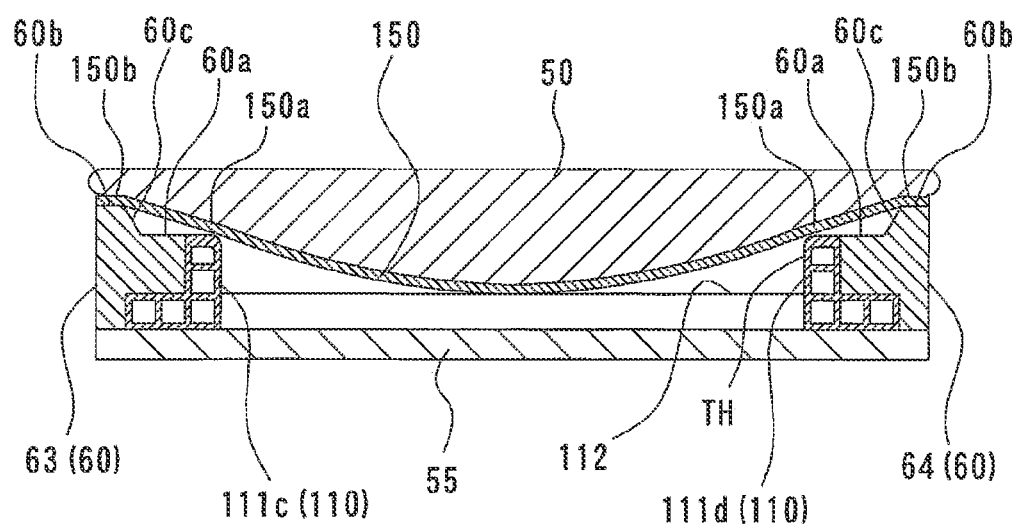
FIG. 23 is a schematic cross-sectional view for illustrating the method for manufacturing an electric vehicle battery case according to the third embodiment.
Figure 24:
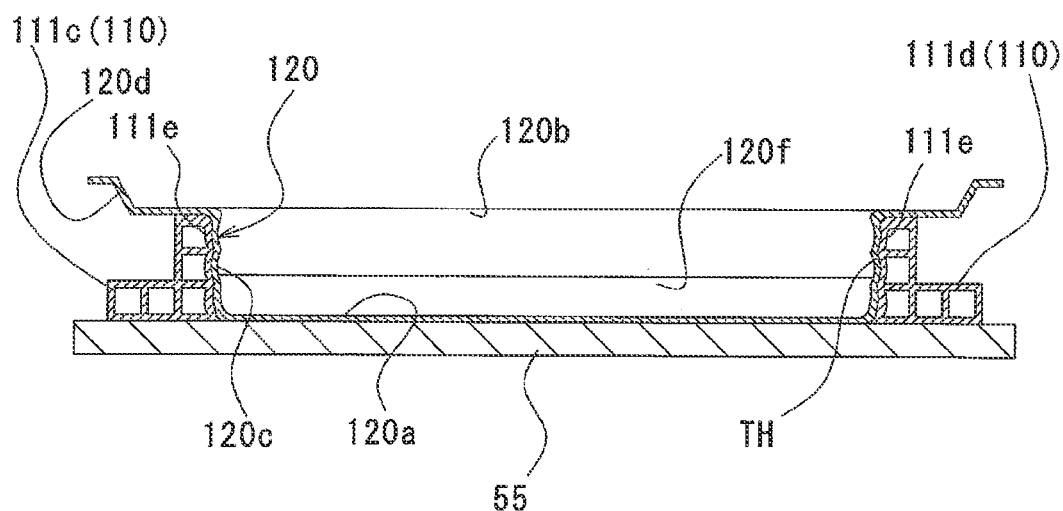
FIG. 24 is a schematic cross-sectional view for illustrating the method for manufacturing an electric vehicle battery case according to the third embodiment.

Specifically, as shown in FIG. 22, the flat plate 150 is disposed on the constraining die 60, and as shown in FIG. 23, the flat plate 150 is pressurized via the hydraulic transfer elastic body 50, whereby the first outer edge portion 150a of the flat plate 150 (portion slightly inside the outermost edge portion) is supported by the frame 110, and the second outer edge portion 150b (outermost edge portion) on the outer side of the first outer edge portion 150a is supported by the second surface 60b of the constraining die 60. Thus, the flat plate 150 is disposed so as to be bent so that the height decreases from the outside toward the inside, and the flat plate 150 is continuously pressurized from the state in which the flat plate 150 is bent in this manner, whereby the flat plate 150 can be deformed into the tray 120 having a bathtub shape, and can be stably joined by press-fitting to the frame 110.

According to the present embodiment, since the flat plate 150 is pressurized in a state where the flat plate 150 is bent so that the height decreases from the outside toward the inside, the amount of the material flowing into the inside of the flat plate 150 can be increased, and the roundness of the ridge line portion or the corner portion of the bottom portion 122a of the tray 120 can be further reduced.

Figure 25:
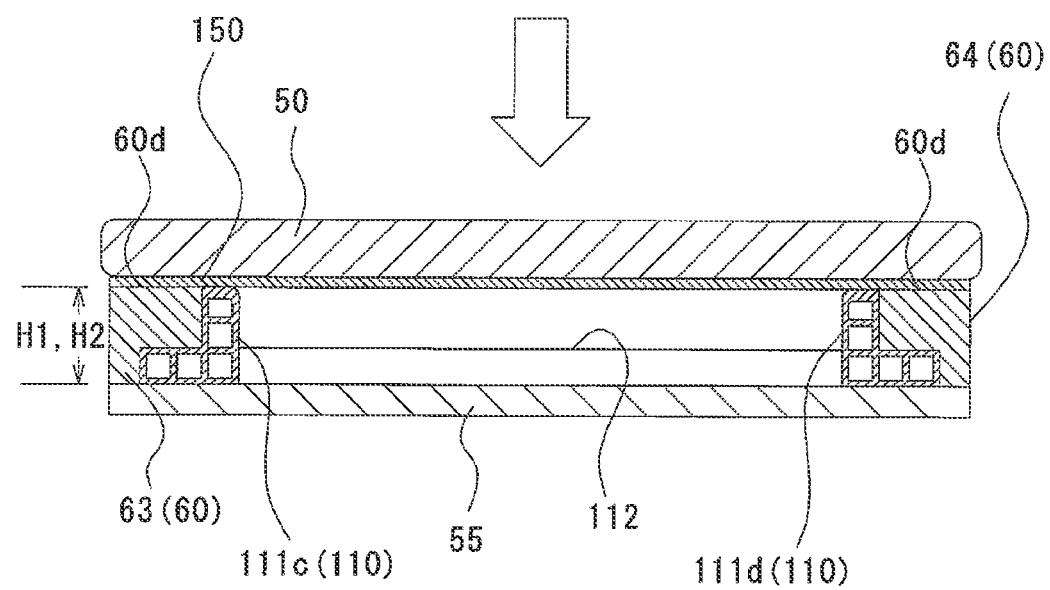
FIG. 25 is a schematic cross-sectional view for illustrating the method for manufacturing an electric vehicle battery case according to a modification of the third embodiment.

In the modification of the third embodiment shown in FIG. 25, the shape of the constraining die 60 is changed. Specifically, the upper portion 60d of the constraining die 60 in this modification is flat. In addition, the height H1 of the constraining die 60 is set to be the same as the height H2 of the frame 110. In particular, when there is no problem in formability when the flat plate 150 is deformed into the tray 120 (see FIG. 3), by making the heights H1 and H2 of the constraining die 60 and the tray 120 the same as in this modification, the width of the flange 120d (see FIG. 3) of the tray 120 can be made minimum necessary. As a result, the material yield of the resin flat plate 150 can be improved.

Fourth Embodiment

Figure 26:
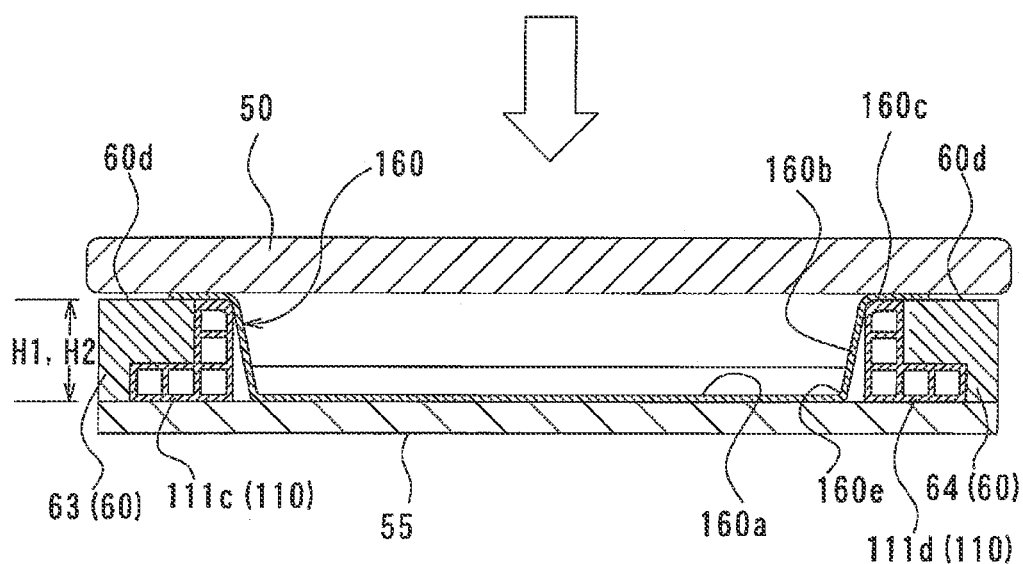
FIG. 26 is a schematic cross-sectional view for illustrating a method for manufacturing an electric vehicle battery case according to a fourth embodiment of the present invention.

As shown in FIG. 26, the constraining die 60 can be used when the primary molded article 160 (see FIGS. 16 to 18) made of the thermoplastic resin having the bathtub shape described in the second embodiment is deformed into the tray 120 (see FIG. 3) by the pressure forming method using the hydraulic transfer elastic body 50. In this case, as in the modification (FIG. 25) of the above-described third embodiment, the heights H1 and H2 of the constraining die 60 and the tray 120 are set to be the same.

In the cross-sectional views (FIGS. 2, 5 to 15, 19, and 22 to 26) showing the frame-shaped body 111 of the frame 120 referred to in the above description, a round shape is not shown except for the inner upper portion described above. However, all corner portions of the frame-shaped body 111 may have round shapes as appropriate.

The invention claimed is:

1. A method for manufacturing an electric vehicle battery case, the method comprising:
   preparing a frame configured to define a space inside and a member to be formed made of resin;
   superposing and disposing the member to be formed on the frame; and
   applying pressure to the member to be formed from an opposite side from the frame to press the member to be formed against the frame to cause the member to be formed to swell in the space, thereby deforming the member to be formed into a tray having a bathtub shape including a bottom wall and a peripheral wall provided at a peripheral edge of the bottom wall and configured to define an opening portion, and integrating the tray with the frame.

2. The method for manufacturing an electric vehicle battery case according to claim 1, wherein the tray further includes a flange provided at a tip of the peripheral wall.

3. The method for manufacturing an electric vehicle battery case according to claim 1, wherein the resin constituting the member to be formed has thermoplasticity,
   the method further comprising heating the member to be formed when pressure is applied to the member to be formed from an opposite side from the frame.

4. The method for manufacturing an electric vehicle battery case according to claim 3, wherein the heating the member to be formed is performed by at least any one of heating the member to be formed itself and heating the frame.

5. The method for manufacturing an electric vehicle battery case according to claim 1, wherein the member to be formed has a flat plate shape.

6. The method for manufacturing an electric vehicle battery case according to claim 1, further comprising primarily molding the member to be formed including a bottom wall, a peripheral wall provided at a peripheral edge of the bottom wall, and a flange provided at a tip of the peripheral wall.

7. The method for manufacturing an electric vehicle battery case according to claim 6,
   wherein the resin is fiber-reinforced resin, and
   wherein the primary molding of the member to be formed is injection molding.

8. The method for manufacturing an electric vehicle battery case according to claim 6,
   wherein the resin is fiber-reinforced resin, and
   wherein the primary molding of the member to be formed is a hot press of SMC.

9. The method for manufacturing an electric vehicle battery case according to claim 1, wherein the frame is made of metal.

10. The method for manufacturing an electric vehicle battery case according to claim 1, wherein applying pressure to the member to be formed from an opposite side from the frame is performed by a pressure forming method.

11. The method for manufacturing an electric vehicle battery case according to claim 10, wherein the applying pressure to the member to be formed from the opposite side from the frame includes:
preparing a hydraulic transfer elastic body configured to be elastically deformed using pressure of liquid,
superposing and disposing the hydraulic transfer elastic body on the member to be formed superposed and disposed on the frame, and
applying pressure to the member to be formed via the hydraulic transfer elastic body.

12. The method for manufacturing an electric vehicle battery case according to claim 1, wherein when the applying pressure to the member to be formed from the opposite side from the frame to deform the member to be formed into the tray is performed, negative angle forming of forming a negative angle at least partially from the bottom wall toward the opening portion of the tray is performed.

13. The method for manufacturing an electric vehicle battery case according to claim 12,
wherein the frame has a negative angle portion in which a negative angle is formed in advance, and
wherein the negative angle forming is performed by pressing the member to be formed against the negative angle portion of the frame when the applying pressure to the member to be formed from the opposite side from the frame to deform the member to be formed into the tray is performed.

14. The method for manufacturing an electric vehicle battery case according to claim 12, wherein the negative angle forming is performed by integrally deforming the frame and the member to be formed to form the negative angle when the applying pressure to the member to be formed from the opposite side from the frame to deform the member to be formed into the tray is performed.

15. An electric vehicle battery case comprising:
a frame made of metal configured to define a space inside; and
a tray made of resin and having a bathtub shape, the tray including a bottom wall positioned in the space, a peripheral wall provided around the bottom wall and configured to define an opening portion on an opposite side from the bottom wall, and a flange provided at a tip of the peripheral wall, the tray being integrated with the frame,
wherein a negative angle portion in which a negative angle directed at least partially inward from the bottom wall toward an opening portion of the tray is provided.

16. The electric vehicle battery case according to claim 15, wherein the tray is made of fiber-reinforced resin.

17. The electric vehicle battery case according to claim 15, wherein the frame is made of an aluminum alloy extruded product, an aluminum alloy cast product, a magnesium alloy extruded product, a magnesium alloy cast product, or a combination of them.

18. The electric vehicle battery case according to claim 15, wherein the frame is made of a steel plate roll form material, a steel plate press component, or a combination of them.

19. The electric vehicle battery case according to claim 15, wherein the frame includes a cross member.

* * * * *